United States Patent [19]

Folkers

[11] Patent Number: 5,186,500
[45] Date of Patent: Feb. 16, 1993

[54] FIBERGLASS TUBULAR COUPLING WITH LINER

[75] Inventor: Joie L. Folkers, Wichita Falls, Tex.

[73] Assignee: Ameron, Inc., Pasadena, Calif.

[21] Appl. No.: 595,272

[22] Filed: Oct. 9, 1990

[51] Int. Cl.⁵ .............................................. F16L 9/14
[52] U.S. Cl. ...................................... 285/55; 285/355; 285/369; 285/423
[58] Field of Search .................. 285/53, 55, 355, 423, 285/92, 369; 411/900, 901, 908, 432

[56] References Cited

U.S. PATENT DOCUMENTS

| | | |
|---|---|---|
| 3,200,023 | 8/1965 | Cilker .............................. 285/55 X |
| 3,339,945 | 9/1967 | McCrory et al. ...................... 285/55 |
| 3,462,175 | 8/1969 | Johnson ............................... 285/53 |
| 4,011,652 | 3/1977 | Block ................................ 285/53 X |
| 4,407,528 | 10/1983 | Anthony .......................... 285/55 X |
| 4,602,807 | 7/1986 | Bowers ............................ 285/55 X |
| 4,991,876 | 2/1991 | Mulvey ........................... 285/355 X |
| 5,033,925 | 7/1991 | Moghe ............................. 411/908 X |

Primary Examiner—Dave W. Arola
Attorney, Agent, or Firm—Christie, Parker & Hale

[57] ABSTRACT

A composite fiberglass tubular coupling comprising an elastically deformable liner. The interior surface of the liner is threaded inwardly from each opposite end. A plurality of buttress ridges are located on the exterior surface of the liner and the exterior surface of the liner is overwound with thermoset resin impregnated fiberglass reinforcing fibers.

15 Claims, 2 Drawing Sheets

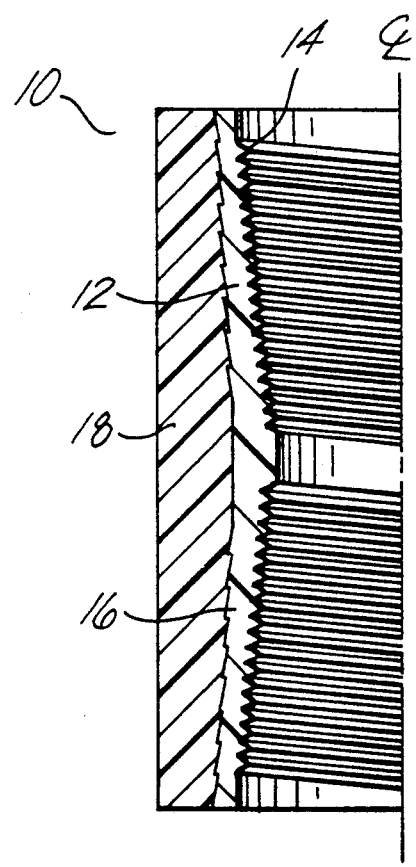

FIBERGLASS TUBULAR COUPLING WITH LINER

BACKGROUND OF THE INVENTION

This invention concerns an improvement of fiberglass tubular threaded joints, more specifically, to a fiberglass tubular coupling with a thermoplastic liner.

Composite fiberglass tubulars, such as line pipe and downhole tubing, are attractive for use in an oil field because of their high degree of corrosion resistance. Typically, steel tubulars are used in the oil field market. These steel tubulars have threads at each end for the purpose of joining sections of the tubing. Assembly of the threaded joints is accomplished by applying thread dope to the threads and then threading the joints using substantially high torque. Steel threads deform elastically under high torque conditions and form a leak tight seal which can be disassembled and reassembled several times. The problem with steel tubulars, however, is that they are not corrosion resistant.

Composite fiberglass tubulars have not been able to penetrate the oil field market and corrosion-resistance service to the extent predicted due to the problems associated with joints. The problem is created because of the rigidity of the threads at the end of the fiberglass tubulars. Fiberglass threads do not deform appreciably and thus are more difficult to seal and are much more susceptible to damage under high torque conditions. High torque may cause the threads to crack and also tends to cause thread compounds to seize in the threads leaving "ground glass" surfaces wedged together which are extremely difficult to break apart. Therefore, composite fiberglass tubulars have proven difficult to disassemble, and reassembly is not assured due to damage done to the threads.

It is, therefore, desirable to provide composite fiberglass tubular couplings with elastically deformable threads for use in high torque conditions.

BRIEF SUMMARY OF THE INVENTION

There is, therefore, provided in practice of this invention, a composite fiberglass tubular coupling with a liner made of an engineering thermoplastic which provides elastically deformable threads for use in high torque conditions. The coupling liner is overwound with fiberglass roving impregnated with liquid thermoset resin and hardener to provide required pressure performance.

BRIEF DESCRIPTION OF THE DRAWINGS

These and other features and advantages of this invention will be appreciated upon consideration of the following detailed description when considered in connection with the accompanying drawings wherein:

FIG. 2 is a partial cross-sectional view of the coupling of FIG. 1.

DETAILED DESCRIPTION OF THE DRAWINGS

Figure 1:
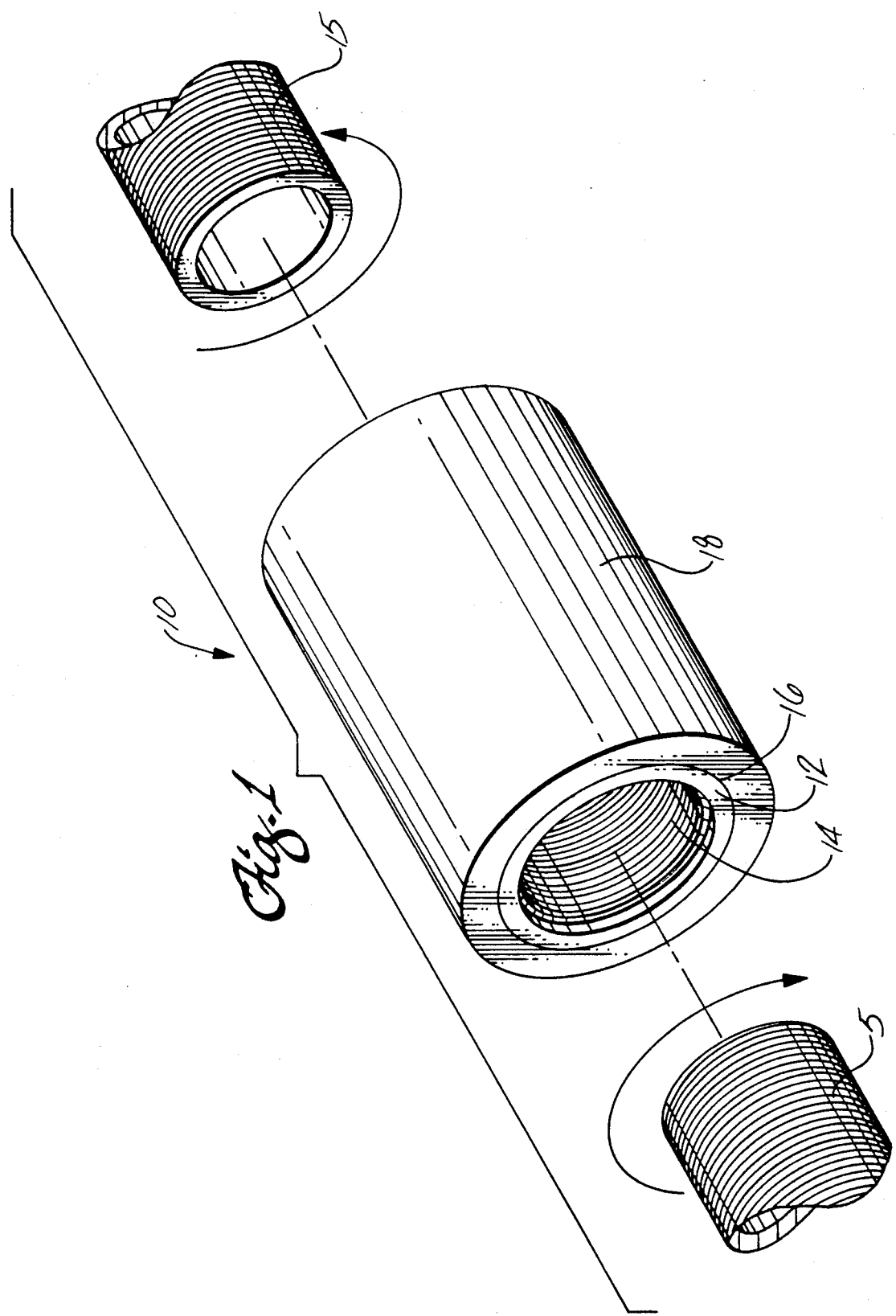
FIG. 1 illustrates isometrically an exemplary composite fiberglass tubular coupling with liner constructed according to principles of this invention.

FIGS. 1 and 2 illustrate an exemplary composite fiberglass tubular coupling with liner constructed according to principles of this invention. The coupling 10 comprises an approximately cylindrical liner 12. The liner is molded with an engineering thermoplastic such as polyphenylene sulfide (PPS), polyetherether ketone, polyetherimide, polysulfone, or others. Engineering thermoplastics differ from commodity-type thermoplastics in that engineering resins have higher strength, resist heat and thermal conditions better, have better impact resistance, can be molded or formed to precise tolerances, and are more expensive. "Engineering thermoplastics" is a term commonly known throughout the plastics industry.

The plastic may be loaded with conventional reinforcement for enhanced strength. The interior surface of the liner has female threads 14 in each opposite end so as to allow the joining of composite fiberglass tubulars 15 successively. Conventional tapered pipe threads are used. The circumference of the threads is slightly larger at the end of the liner than in the middle and the threads stop slightly before the middle of the insert. Such couplings may be used for a broad variety of pipe sizes, such as, for example, from nominal one inch to 24 inch pipes (2 to 60 cm.)

The dimensions of the threads are controlled by the API (American Petroleum Institute) Specification 5B for long form round threads. This thread seals on the flanks of the mating threads (angled portion or sides). The roots and crests of the mating threads do not fit together precisely. The crest has a sharper radius than does the root so a spiral channel is formed when the parts are screwed together. This channel is filled with thread compound applied to the open threads prior to assembly to cause the seal.

The distance between adjacent threads, or lead, is not always precise. When this happens, deformation of the thread form will occur, not just the surface. This deformation is necessary to allow proper distribution of the load put on the joint due to pressure, tension or bending. Deformation of the plastic liner does not imply that the liner cannot be reused, in fact, it is the reason they can be reused.

The use of an engineering thermoplastic provides adequate thread strength and the feature of elastic deformation thereby curing the problem of fiberglass rigidity. Elastic deformation results in the threads returning to their original form once the applied stress of a mating thread is removed. All plastics have a property of visco-elasticity which comes into play over time. With time, plastic will tend to flow due to the applied stress in an attempt to relieve the stress, which is similar to plastic, or non-reversing, deformation. This visco-elastic flow does not affect the performance of the liner and allows reuse.

Because there is no longer a fiberglass to fiberglass surface interface the problems of thread cracking due to high torque is eliminated. The problem of "ground glass" in the joint is also eliminated. The liner provides a dissimilar surface at the thread interface to prevent galling, a surface of known texture and friction coefficient to control make up and break out torque and material of adequate strength to withstand high longitudinal loads encountered in the intended service.

Located on the outer surface of the insert are buttress ridges 16 for engagement by an outer layer of composite fiberglass 18 for preventing withdrawal of the liner. Although exact dimensions do not have to be definite, the ridges are typically approximately 6 mm. longitudinally spaced with a height of about 1 mm. The buttress ridges are positioned to create a mechanical lock with the composite fiberglass 18. The composite typically comprises a fiberglass roving impregnated with liquid epoxy resin and hardener which is circumferentially overwound on the exterior surface of the liner to provide required pressure performance of the coupling. The composite can also comprise other types of reinforcing fibers as well as other types of thermoset resins. The typical method for applying the fiberglass composite is by placing the liner on a mandrel and spinning the mandrel while winding the composite in circumferential helical or longitudinal patterns across the exterior surface of the liner until the desired thickness and strength characteristics are reached. Overwinding the liner results in a chemical bond between the solid liner and the liquid resin which changes state to a solid as the resin cures.

The coupling creates a rigid joint connection with the liner functioning as a corrosion and sealing member. Because the threads are molded into the liner and since they elastically deform, the coupling as well as the composite fiberglass tubulars are reusable.

Although the coupling has been described as a cylinder, the coupling can also take other forms such as elbows or tees. The liner for such fittings are L- and T-shaped, respectively. In any case the liner extends all of the way through the coupling. Otherwise there could be a leak path between an inner end of the threaded liner and the surrounding composite fiberglass reinforced layer. Although buttress ridges ar shown on the exterior of the liner for engagement by the fiber wound layer, other irregular or noncylindrical surfaces may be used.

Many other modifications and variations will be apparent to one skilled in the art. It is, therefore, to be understood that within the scope of the appended claims the invention may be practiced otherwise than specifically described.

What is claimed is:

1. A pipe coupling comprising:
    a threaded liner of thermoplastic material having sufficient strength for coupling with a threaded composite fiberglass reinforced pipe and sufficiently deformable for sealing against the thread of the pipe; and
    a wrapping of composite fiberglass reinforced thermoset material over the threaded liner and sufficiently strong for preventing the liner from separating from the pipe when subjected to the fluid pressure within the pipe; the liner having sufficient external surface irregularities for engaging the composite wrapping and preventing withdrawal of the liner from the coupling.

2. A pipe coupling as recited in claim 1 wherein the liner extends to both ends of the coupling.

3. A pipe coupling as recited in claim 1 wherein the liner extends all of the way through the coupling.

4. A pipe coupling as recited in claim 1 wherein the liner is a cylinder.

5. A pipe coupling as recited in claim 1 wherein the thermoplastic material is selected from the group consisting of polyphenylene sulfide, polyetherether ketone, polyetherimide, and polysulfone.

6. A composite fiberglass tubular coupling for connecting two lengths of threaded pipe, the coupling comprising:
    a thermoplastic liner substantially free of glass fibers;
    the liner containing an interior threaded surface and an exterior surface;
    a plurality of engagement elements located on the liner exterior surface;
    the liner being sufficiently deformable for sealing against the threads of the pipes; and
    thermoset resin impregnated fiberglass overwinding the liner exterior surface for providing strength to the coupling.

7. A fiberglass tubular coupling as recited in claim 6 wherein the liner extends to both ends of the coupling for sealing against the thread of each of the pipes.

8. A fiberglass tubular coupling as recited in claim 6 wherein the interior threaded surface of the liner is threaded inwardly from each opposite end.

9. A fiberglass tubular coupling as recited in claim 6 wherein the engagement elements prevent withdrawal of the liner from the coupling.

10. A fiberglass tubular coupling as recited in claim 6 wherein the plastic liner extends all the way through the coupling and is a high strength, high heat, thermal and impact resistant plastic which can be molded to a precise tolerance.

11. A pipe joint comprising:
    a first piece of composite fiberglass reinforced pipe having a male thread;
    a second piece of composite fiberglass reinforced pipe having a male thread; and
    a pipe coupling with female threads at opposite ends for coupling the first and second pipes together, the pipe coupling comprising:
        an inner thermoplastic liner having a non-cylindrical external surface and female threads at both ends sufficiently deformable for sealing against the threads on the pipes; and
        an outer layer of composite fiberglass reinforced thermoset material for strengthening the coupling, the outer layer surrounding the liner and engaging the non-cylindrical surface for retaining the liner in the outer layer.

12. A pipe joint as recited in claim 11 wherein the liner extends to both ends of the coupling.

13. A pipe joint as recited in claim 11 wherein the liner extends all the way through the coupling.

14. A pipe joint as recited in claim 11 wherein the female threads are threaded inwardly from each opposite end.

15. A pipe joint as recited in claim 11 wherein the thermoplastic material is selected from the group consisting of polyphenylene sulfide, polyetherether ketone, polyetherimide, and polysulfone.

* * * * *